United States Patent
Kramer

(10) Patent No.: US 7,240,774 B2
(45) Date of Patent: Jul. 10, 2007

(54) EXTENDED RANGE HALL EFFECT DISPLACEMENT SENSOR

(75) Inventor: Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 36 days.

(21) Appl. No.: 10/674,225

(22) Filed: Sep. 29, 2003

(65) Prior Publication Data

US 2005/0067230 A1    Mar. 31, 2005

(51) Int. Cl.
*F16D 65/14*    (2006.01)
(52) U.S. Cl. .................................. 188/196 V; 188/71.9
(58) Field of Classification Search ........... 188/1.11 R, 188/1.11 W, 1.11 L, 1.11 E, 206 R, 196 R, 188/196 M, 196 B, 196 BA, 196 V, 71.8, 188/71.9, 72.7; 324/207.2 X
See application file for complete search history.

(56) References Cited

U.S. PATENT DOCUMENTS

| | | | |
|---|---|---|---|
| 5,359,288 A | 10/1994 | Riggs | |
| 5,670,876 A | 9/1997 | Dilger | |
| 6,000,507 A | 12/1999 | Bohm et al. | |
| 6,250,434 B1 | 6/2001 | Baumgartner et al. | |
| 6,293,370 B1 | 9/2001 | McCann et al. | |
| 6,397,977 B1 * | 6/2002 | Ward .................... | 188/1.11 L |
| 6,552,532 B1 * | 4/2003 | Sako ....................... | 324/207.2 |
| 6,586,928 B1 * | 7/2003 | Reichl et al. ............ | 324/207.2 |

FOREIGN PATENT DOCUMENTS

| | | |
|---|---|---|
| DE | 101 33 163 A1 | 8/2002 |
| JP | 4-34312 | 2/1992 |
| JP | 2003-515711 | 12/2000 |

OTHER PUBLICATIONS

European Search Report, dated Jul. 27, 2006.

* cited by examiner

*Primary Examiner*—Melanie Torres
(74) *Attorney, Agent, or Firm*—Carlson, Gaskey & Olds, P.C.

(57) ABSTRACT

A displacement sensor utilizes a Hall effect sensor and a magnet, but has an extended range compared to conventional Hall effect displacement sensors. Relative movement between the sensor and the magnet is defined such that the path of movement is not parallel to an axis between the north and south poles of the magnet. Thus, the total path of movement is greater than in the prior art. One particularly preferred application for this sensor is in a disc brake, and as part of an adjustment mechanism for adjusting the position of the disc brake pistons. The displacement sensor is relatively small, and thus can be accommodated in the crowded environment of the disc brake adjustment mechanism. On the other hand, with the inventive large range displacement sensor, the simple and compact sensor can provide adequate measurement of the displacement of the piston.

26 Claims, 3 Drawing Sheets

EXTENDED RANGE HALL EFFECT DISPLACEMENT SENSOR

BACKGROUND OF THE INVENTION

This application relates to a displacement sensor utilizing a Hall effect sensor and a magnet, wherein the travel of the Hall effect sensor is non-parallel to an axis between the poles of the magnet, extending the range of the displacement sensor.

One known type of displacement sensor includes a Hall effect sensor placed adjacent to a magnet. The Hall effect sensor and the magnet are attached to different objects. The two objects move relative to each other, and the Hall effect sensor, by sensing the relative position of the magnet, can determine the amount of relative movement of the objects.

Such displacement sensors have had limited application in that there is typically a limited distance range which can be measured. As an example, typical production Hall effect displacement sensors are able to measure approximately 0.25" of movement.

For many applications, the Hall effect sensor and its 0.25" range would be insufficient. One example is a displacement sensor for sensing the amount of movement of a piston in a disc brake due to friction surface wear. As known, a brake actuator drives a pair of pistons in a disc brake, and the pistons force a brake pad against a rotating component, slowing rotation of the rotating component. There is normal wear on the brake pad, and typically a disc brake piston is provided with an adjustment mechanism. The adjustment mechanism has historically included a mechanical linkage that senses the total movement, and adjusts the piston relative to a tappet gear to take up clearance. Typically, there is a desired amount of piston movement, and with wear on the brake pad, the piston needs to move an amount beyond this desired amount. Thus, the adjustment mechanism changes a rest, or starting position of the piston such that it only needs to move the desired amount, even with wear on the brake pad.

More recently, electric motors have been developed for replacing the mechanical linkage in the adjustment mechanism. An electric motor typically drives a gear, that in turn will drive the tappet gears to adjust the pistons.

Such an electric motor adjustment mechanism would benefit from feedback of the amount of necessary adjustment. Thus, some sensor for sensing the amount of movement of the pistons is desirable. The limited range provided by the current Hall effect displacement sensors is inadequate for this application. On the other hand, in the vicinity of the disc brake and its pistons, there is limited available space. For this reason, the relatively small Hall effect sensor would be quite desirable.

SUMMARY OF THE INVENTION

In a disclosed embodiment of this invention, a Hall effect sensor is positioned adjacent to a magnet such that relative movement of the two extends along a path that is non-parallel to an axis drawn between the poles of the magnet. In the past, the movement of the Hall effect sensor has generally been parallel to an axis drawn between the poles of the magnet. Since the relative movement path of the sensor and the axis between the poles of the magnet is non-parallel, the total distance or "range" of movement that can be sensed extends along a much greater distance.

In one embodiment, the path can be more than three times the typical Hall effect sensor, 0.75", or even 1.0". This extended range is sufficient such that a Hall effect displacement sensor can be utilized to monitor the full displacement of the disc brake pistons.

The preferred application for the inventive Hall effect sensor is to monitor the displacement in a disc brake, and provide feedback to an electric motor for adjusting the position of the piston. However, other applications of the extended range Hall effect sensor would be apparent to those of ordinary skill in the art.

In a most preferred embodiment, the magnet is attached to a part that moves when the pistons move. The Hall effect sensor is fixed to be spaced by a small gap from this magnet. As the pistons move, the magnet will move relative to the Hall effect sensor. The two are positioned relative to each other such that the path of movement is non-parallel as mentioned above. More preferably, the path is along an angle that is both non-parallel and non-perpendicular to the axis between the poles. In this way, the total sensing distance is maximized.

The magnet may include a single pair of poles, or may be an arrangement including a pair of spaced magnet members each having a pair of spaced poles. In other embodiments, the magnet may be a bar magnet having pole faces, rather than distinct smaller poles. Further, in one embodiment, the magnet and sensor are guided along each other for movement in a single direction, to maintain a known and desired gap between the magnet and the Hall effect sensor.

These and other features of the present invention will become apparent when considered in conjunction with the following drawings and specification. The following is a brief description of the drawings.

DETAILED DESCRIPTION OF THE PREFERRED EMBODIMENT

Figure 1:
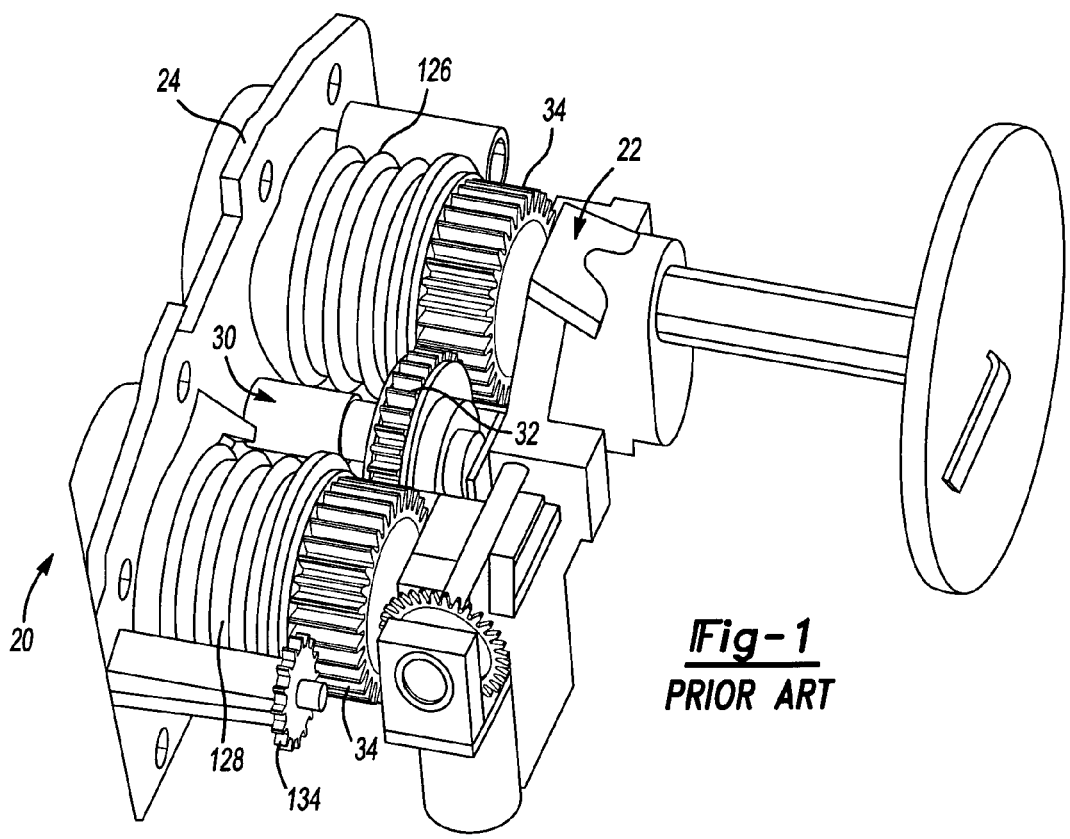
FIG. 1 shows a known electrically-adjusted disc brake.

Disc brake 20 is illustrated in FIG. 1 having an actuator 22, as known. A brake pad 24 is driven toward an item that is to be braked by the disc brake 20. A pair of actuator assemblies 126 and 128 drives the brake pad 24 toward the item to be braked upon control of the actuator 22 as explained below.

As is known, the position of the assemblies 126 and 128 should be adjusted toward the item to be braked, or to the left as shown in FIG. 1, with wear on the brake pad 24. Thus, it is known to have gear 32 and tappet gears 34 for providing adjustment. Historically, this adjustment has been mechanical. However, more recently, this adjustment has been provided by utilizing an electric motor. Elector motor 30 is illustrated in FIG. 1. Such an arrangement is shown, for example in U.S. Pat. No. 6,293,370. A manual adjustment mechanism 134 engages one of the tappet gears 34 associated with one of the actuator assemblies, here 128. This manual adjuster 134 is provided so that an operator of the disc brake 20 can manually adjust the actuator assemblies 126 and 128 away from the item to be braked, such that the brake pad 24 can be changed.

Figure 2A:
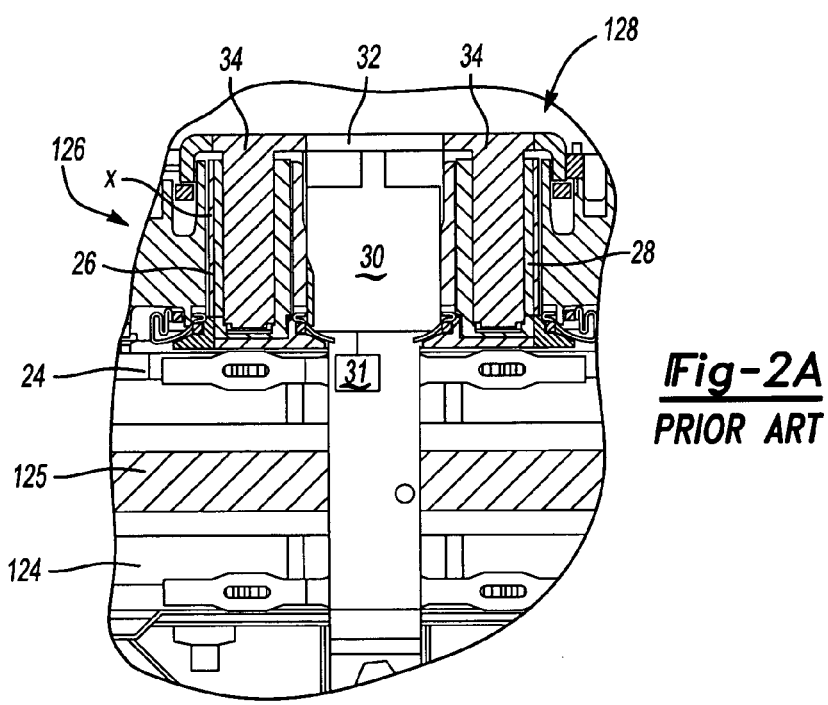
FIG. 2A is a cross-sectional view through the FIG. 1 disc brake.

FIG. 2A is a cross-sectional view showing the tappet gears 34 driven by the drive gear 32, and which is schematically shown as being driven by the motor 30. As can be appreciated, the actuator assemblies 126 and 128 have pistons 26 and 28 with internally threaded inner peripheries which are driven when the tappet gears 34 are rotated by the gear 32. In this manner, the pistons 26 and 28 can be advanced toward the brake pad 24 to accommodate wear. The pistons 26 and 28 are constrained against rotation, such that when the tappet gears 34 are driven to turn, the threads advance the pistons 26 and 28 forwardly.

When the actuator 22 is actuated to cause braking, the entire actuator assemblies 126 and 128, including both pistons 26 and 28 and tappet gears 34 move downwardly as shown in FIG. 2A, forcing brake pad 24 towards an item to be braked 125. At the same time, through a known mechanical arrangement, the second brake pad 124 is brought against an opposed face of item 125. With wear on the brake pads 24 and 124, the amount of movement toward this braking position will increase. The motor 30 is utilized to advance the pistons 26 and 28 downwardly in FIG. 2A to take up this clearance.

Figure 2B:
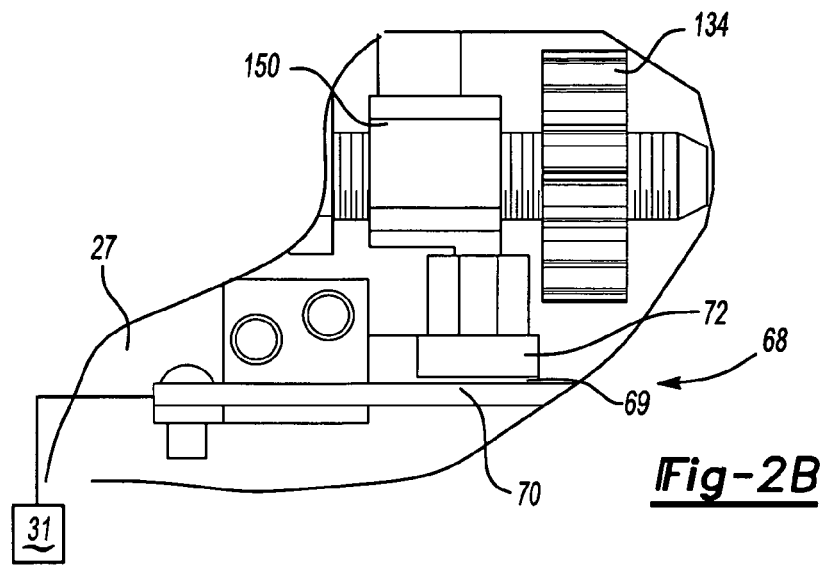
FIG. 2B shows an inventive sensor and magnet mount.

Preferably, a control 31 for the motor 30 should be provided information on how much to advance the pistons 26 and 28. FIG. 2B shows a sensor arrangement 68, which includes a Hall effect sensor 70 and a magnet 72. Such a sensor arrangement 68 can be utilized to provide feedback of the amount of movement of the piston, and thus an indication to a control 31 for the motor 30 of how much adjustment is necessary. In this embodiment, magnet 72 is attached to move with an element 150 which rides along the manual adjustment mechanism 134. This element 150 will move through the full braking stroke, along with both actuator assemblies 126 and 128. Now, as the pistons 26 and 28 are driven through the actuator 22, the magnet 72 moves with the element 150. When the brake is actuated in this manner, the amount of movement of the pistons 26, 28 will be related to the amount of movement of the magnet 72.

The Hall effect sensor 70 is mounted on a fixed housing portion 27. Thus, as the magnet 72 moves, the Hall effect sensor 70 remains stationary, and the magnet 72 moves relative to the Hall effect sensor 70. As shown, a gap 69 is maintained between the magnet 72 and the Hall effect sensor 70.

Figure 3:
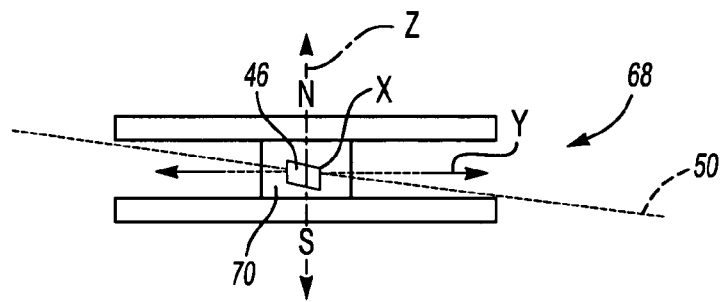
FIG. 3 schematically shows a feature of movement of a first embodiment sensor.

FIG. 3 shows the relative path of movement 50 of the Hall effect sensor 70 relative to the poles of the magnet 72. As can be appreciated, the movement path 50 is non-parallel to a line Z drawn between the poles of the magnet 72. Moreover, another line drawn perpendicular to the line between the poles, line Y, is also at an angle to the path 50. Thus, the length of path 50 can be designed to be at a maximum while still being within an acceptable distance of the poles. That is, the extent of path 50 is greater than the extent of the path Y, and much greater than the extent of a line drawn between the north and south poles of the magnet 72. In this manner, the distance over which the sensor arrangement 68 can sense relative movement is increased. As also shown in FIG. 3, the Hall effect sensor 70 is at a center point 46 on which it lies on the path between the north and south pole. The axis extending between the north and south poles could be said to define a plane to extend perpendicularly to, and between the north and south poles. An extension of path 50 would pass through this plane.

Figure 4:
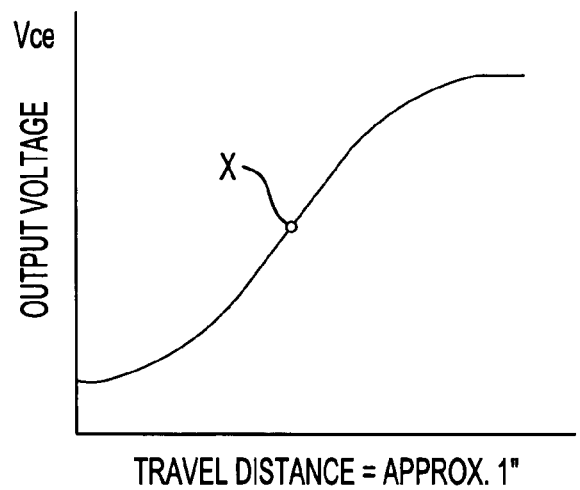
FIG. 4 is a chart showing the output voltage vs. travel distance for the FIG. 3 embodiment.

As shown in FIG. 4, the output voltage of the sensor would extend both higher and lower as the sensor moves away from this position 46. The output voltage is thus indicative of the amount of movement. As can further be appreciated, a travel distance of as much as an inch may be obtained with such a simple sensor. As is clear from FIG. 4, the signal changes non-linearly with travel distance.

Figure 5A:
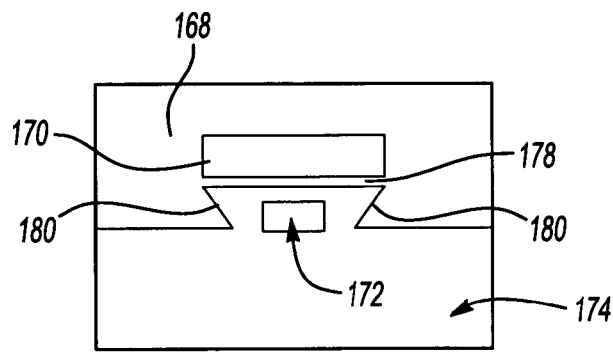
FIG. 5A shows another embodiment of the magnet.

As shown in FIG. 5A, another embodiment has a magnet housing 168 receiving the magnet 170. The sensor 172 is received in its own housing 174. As can be appreciated, a gap 178 is maintained between the magnet 170 and the sensor 172. As also can be appreciated, there are a pair of angled sides 180, angled inwardly, such that the housing 168 is closely guided on the housing 174. In this manner, movement of the magnet 170 relative to the sensor 172 is constrained except along the direction through which the pistons move when actuating the brake. In this manner, the extent of the gap 178 is predictable, and closely maintained.

Figure 5B:
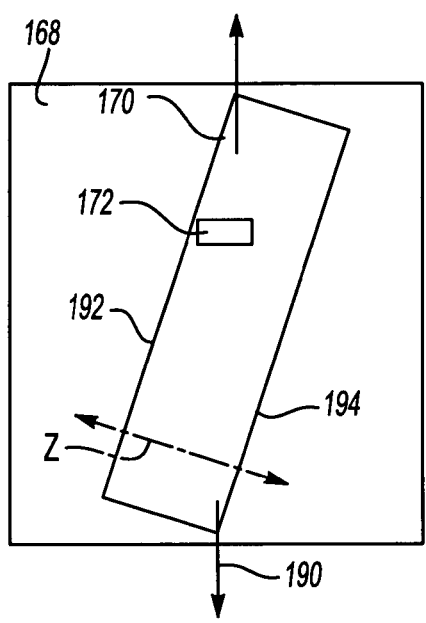
FIG. 5B diagrammatically shows the movement of the FIG. 5A magnet relative to the sensor.

FIG. 5B shows the FIG. 5A embodiment, somewhat schematically, but to illustrate the movement. In this embodiment, the magnet 170 is a bar magnet having opposed pole faces 192 and 194. Again, the path of movement 190 of the sensor 172 relative to the magnet 170 is non-parallel to a line Z drawn between these pole faces, and non-parallel to a line perpendicular to the line drawn between the pole faces. Again, this will result in an increase in the travel and sensing distance provided by the inventive Hall effect displacement sensor.

Figure 6:
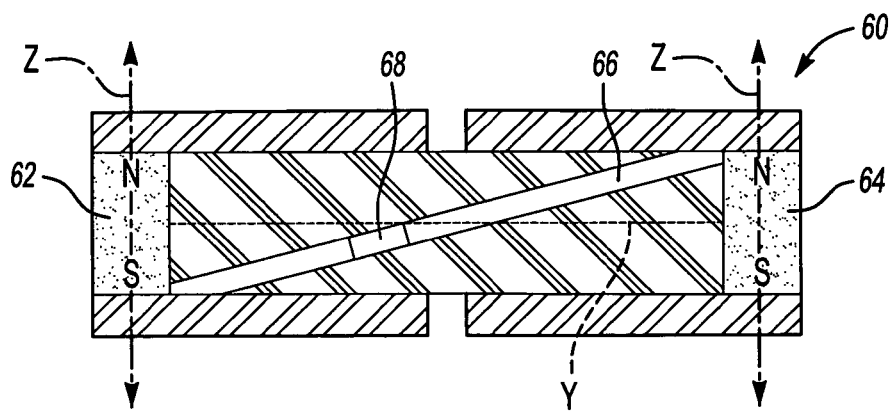
FIG. 6 shows a third embodiment.

FIG. 6 shows yet another embodiment 60. In embodiment 60, there are spaced magnets 62 and 64. Again, the path 66 of the sensor 68 is non-parallel to a line Z drawn between the pole set of either magnet 62 or 64, and is also at an angle relative to the line Y drawn perpendicular to the axis between the pole sets 62 and 64.

In sum, a unique Hall effect sensor has an extended range because its path relative to a magnet is not parallel to a line drawn between the poles of the magnet.

While preferred embodiments of this invention and a preferred application for this sensor have been disclosed, a worker of ordinary skill in the art would recognize that modifications would come within the scope of this invention. For this reason, the following claims should be studied to determine the true scope and content of this invention.

What is claimed is:

1. A brake system comprising:
   a first member being driven to bring a friction surface against an item to be braked; and
   a magnet having at least a first set of north and south poles, and a Hall effect sensor, one of said magnet and said Hall effect-sensor being mounted to be movable with said first member when said first member moves the friction surface to actuate braking, the other of said magnet and said Hall effect sensor being mounted on an item movable relative to said first member, relative movement between said magnet and said Hall effect sensor being along a first path, and an axis being defined extending through said at least first set of north and south poles of said magnet, said axis and said first path being non-parallel, and said first path and said axis also being non-perpendicular to each other.

2. The brake system as set forth in claim 1, wherein said first member is a piston for bringing a brake pad into engagement with the item to be braked.

3. The brake system as set forth in claim 2, wherein said magnet is fixed to move with said piston, and said Hall effect sensor is fixed within a housing for the brake system.

4. The brake system as set forth in claim 3, wherein said Hall effect sensor provides feedback of an amount of adjustment necessary for said piston.

5. The brake system as set forth in claim 4, wherein said feedback is provided to an electric motor for driving adjustment of said piston.

6. The brake system as set forth in claim 5, wherein said piston includes a pair of spaced pistons, and each of said pair of spaced pistons being driven for adjustment.

7. The brake system as set forth in claim 3, wherein said magnet is fixed to move with an element mounted on a manual adjustment mechanism, said element being movable when said piston is driven to move the brake pad to actuate braking.

8. The brake system as set forth in claim 1, wherein said magnet includes a single pair of spaced poles, with said first path crossing said axis, and including potential movement on each side of said axis.

9. The brake system as set forth in claim 1, wherein said magnet includes a pair of spaced north and south pole sets defining ends of movement, and said first path being laterally positioned between said pair of spaced north and south pole sets.

10. The brake system as set forth in claim 1, wherein said magnet is a bar magnet having north and south pole faces.

11. The brake system as set forth in claim 1, wherein said first path is defined by said magnet being movable relative to said Hall effect sensor along a direction through which said first member moves to actuate braking, said magnet being constrained against movement relative to said Hall effect sensor in other directions.

12. The brake system as set forth in claim 11, wherein said magnet and said Hall effect sensor have overmolded plastic housings, said overmolded plastic housings being guided along each other to constrain said magnet and said Hall effect sensor to move relative to each other only along said direction of movement of said first member.

13. The brake system as set forth in claim 1, wherein said axis also defines a plane to extend perpendicularly to faces of said at least first set of north and south poles, and between said at least first set of north and south poles, and said first path being such that an extension of said first path would pass through said plane.

14. The brake system as set forth in claim 9, wherein said axis also defines a plane to extend perpendicularly to faces of said pair of spaced north and south pole sets, and between said pair of spaced north and south pole sets, and said path being such that an extension of said path would pass through said plane.

15. The brake system as set forth in claim 1, wherein a signal is produced by relative movement between the Hall effect sensor and the magnet, and said signal changing non-linearly with relative movement between the Hall effect sensor and the magnet.

16. A distance sensor comprising:
a magnet having at least a north pole and a south pole, with an axis extending through said north and said south poles; and
a Hall effect sensor, said Hall effect sensor and said magnet being mounted for movement relative to each other along a linear path, said linear path being non-parallel to said axis, and said linear path and said axis also being non-perpendicular to each other.

17. The distance sensor as recited in claim 16, wherein said magnet includes a single set of spaced north and south poles, with said linear path crossing said axis, and including potential movement on each side of said axis.

18. The distance sensor as recited in claim 16, wherein said magnet includes a pair of laterally spaced north and south pole sets defining ends of movement, and said linear path being laterally positioned between said pair of laterally spaced north and south pole sets.

19. The distance sensor as recited in claim 16, wherein said magnet is a bar magnet having north pole and south pole faces.

20. The distance sensor as set forth in claim 16, wherein said linear path is defined by said magnet being movable relative to said Hall effect sensor along a first, direction, said magnet being constrained against movement relative to said Hall effect sensor in other directions.

21. The distance sensor as set forth in claim 20, wherein said magnet and said Hall effect sensor have overmolded plastic housings, said overmolded plastic housings being guided along each other to constrain said magnet and said Hall effect sensor to move relative to each other only along said first direction.

22. The distance sensor as set forth in claim 16, wherein said axis also defines a plane to extend perpendicularly to faces of said north and south poles, and between said north and south poles, and said linear path being such that an extension of said linear path would pass through said plane.

23. The distance sensor as set forth in claim 16, wherein a signal is produced by relative movement between the Hall effect sensor and the magnet, and said signal changing non-linearly with relative movement between the Hall effect sensor and the magnet.

24. A disc brake actuator comprising:
a pair of pistons, each of said pair of pistons being driven to drive a brake pad into engagement with an item to be braked;
an adjustment mechanism for said pair of pistons, said adjustment mechanism including tappet gears associated with each of said pair of pistons and driven to drive a threaded tappet, said threaded tappet in turn driving said pair of pistons, said pair of pistons being constrained from rotation such that when said tappet gears are driven to rotate, a threaded connection between said tappet gears and said pair of pistons causes said pair of pistons to move linearly and compensate for wear on said brake pad;
an electric motor for driving said tappet gears; and
a displacement sensor for sensing movement of at least one of said pair of pistons during braking operation, said displacement sensor providing feedback to a control for said electric motor, said control controlling said electric motor to drive said tappet gears and provide appropriate adjustment based upon an amount of movement sensed by said displacement sensor, said displacement sensor including a magnet having at least a north and a south pole, with an axis extending through said north and said south poles, and a Hall effect sensor movable relative to said magnet, and a path of movement between said Hall effect sensor and said magnet being defined such that said path of movement is linear and is non-parallel to said axis, and said path of movement and said axis also being non-perpendicular to each other.

25. The disc brake actuator as set forth in claim 24, wherein a signal is produced by relative movement between the Hall effect sensor and the magnet, and said signal changing non-linearly with relative movement between the Hall effect sensor and the magnet.

26. A disc brake actuator comprising:
- a pair of pistons, each of said pair of pistons being driven to drive a brake pad into engagement with an item to be braked;
- an adjustment mechanism for said pair of pistons, said adjustment mechanism including tappet gears associated with each of said pair of pistons and driven to drive a threaded tappet, said threaded tappet in turn driving said pair of pistons, said pair of pistons being constrained from rotation such that when said tappet gears are driven to rotate, a threaded connection between said tappet gears and said pair of pistons causes said pair of pistons to move linearly and compensate for wear on said brake pad;
- an electric motor for driving said tappet gears;
- a displacement sensor for sensing movement of at least one of said pair of pistons during braking operation, said displacement sensor providing feedback to a control for said electric motor, said control controlling said electric motor to drive said tappet gears and provide appropriate adjustment based upon an amount of movement sensed by said displacement sensor, said displacement sensor including a magnet having at least a north and a south pole, with an axis extending through said north and said south poles, and a Hall effect sensor movable relative to said magnet, and a path of movement between said Hall effect sensor and said magnet being defined such that said path of movement is non-parallel to said axis, and said path of movement and said axis also being non-perpendicular to each other; and
- said magnet being fixed to move when said pair of pistons move, and said Hall effect sensor being fixed within a housing.

* * * * *